Figure 1:
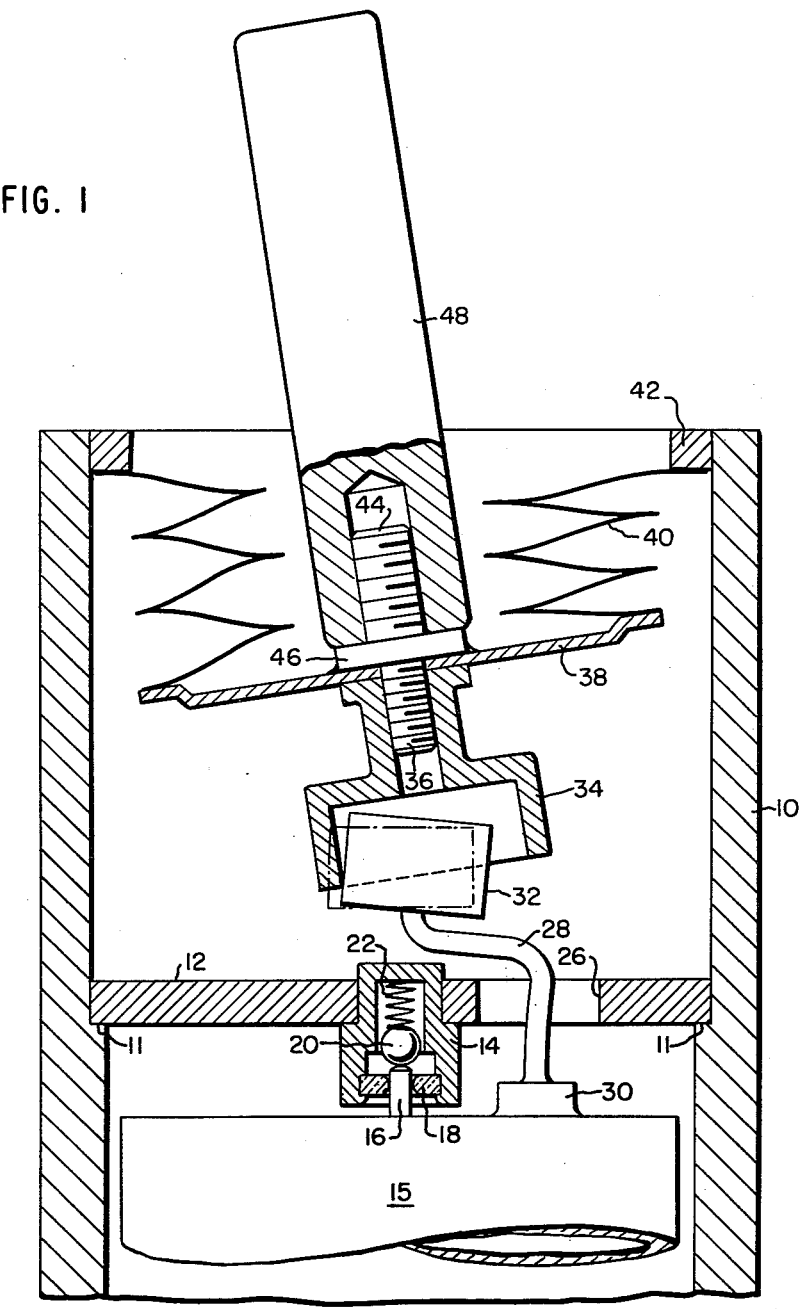

July 31, 1962     E. L. SWAINSON ET AL     3,046,797

APPARATUS FOR ADJUSTING SEALED MECHANISMS

Filed March 31, 1960     2 Sheets-Sheet 1

INVENTORS
EDWARD L. SWAINSON
S EDWARD BORG
BY
KENWAY, JENNEY, WITTER & HILDRETH

ATTORNEYS

INVENTORS
EDWARD L. SWAINSON
S EDWARD BORG
BY
KENWAY, JENNEY, WITTER & HILDRETH
ATTORNEYS

United States Patent Office 3,046,797
Patented July 31, 1962

3,046,797
APPARATUS FOR ADJUSTING SEALED MECHANISMS
Edward L. Swainson, Newtonville, and S. Edward Borg, Westwood, Mass., assignors to Northrop Corporation, Beverly Hills, Calif., a corporation of California
Filed Mar. 31, 1960, Ser. No. 18,921
5 Claims. (Cl. 74—5.4)

This invention relates in general to the adjustment of position of an object within a sealed case and particularly to such a device which utilizes the transverse flexibility of a bellows incorporated in and forming a part of such a case.

Numerous instruments and various other devices are housed in containers which may be hermetically sealed. Often, after the sealing operation, it is desired to make some further adjustment of the sealed unit. In fact, in some very precise instruments, adjustment after sealing is essential to the proper operation of the device.

One example of such a device is a gyroscope which may be used in a missile guidance system or in some other application where the very highest degree of accuracy is needed. Quite often, gyroscopes are of the "floated" type which in their final assembly are designed to have the rotary mechanism sealed in a container filled with a fluid. Under such circumstances, it sometimes happens that although the rotary member appears to be balanced prior to assembly within the container, it becomes unbalanced to some degree after its assembly within the container. This unbalance may result from a misalignment of supports within the container with the mounting members on the rotary device; the accumulation of tolerances in the various bearing parts may also result in a similarly undesirable condition of imbalance, or other more subtle problems may exist.

In the particular case of gyroscopes, not only is the required degree of accuracy practically infinitesimal, but also typical "floated" gyroscopes are immersed in oil and sealed hermetically within containers. Any correction of imbalance after assembly is therefore most inconvenient to achieve.

It is, therefore, an object of the present invention to provide apparatus for shifting the position of a member which is sealed in a container.

It is another object of the present invention to provide balance correction for the gimbal of a hermetically sealed gyroscope.

It is still another object of the present invention to improve gyroscope performance by providing completed gyroscopes having their gimbals balanced about their axes of rotation.

In general, the present invention consists in a sealed container having a flexible wall section such as a bellows or diaphragm sealed into and forming a part of the wall of the container. Within the container the object to be adjusted in position is held in any given position more or less permanently. However, the support structure is deformable or otherwise capable of adjustment to permit movement of the object to a different position. The flexible wall section in the container is adjacent the object and in this way adjustments may be made by the use of a suitable tool for manipulating the flexible section.

The objects of the present invention are achieved in the case of balancing floated gyroscopes by taking advantage of the presence of an expansion compensating mechanism in the container or housing of the apparatus. This expansion device is usually in the form of a bellows or diaphragm which is included as part of the housing or container wall to absorb the growth of the fluid which occurs as temperature rises. Conversely, the expansible member reduces container volume as the fluid volume decreases under the influence of decreasing temperature.

Figure 2:
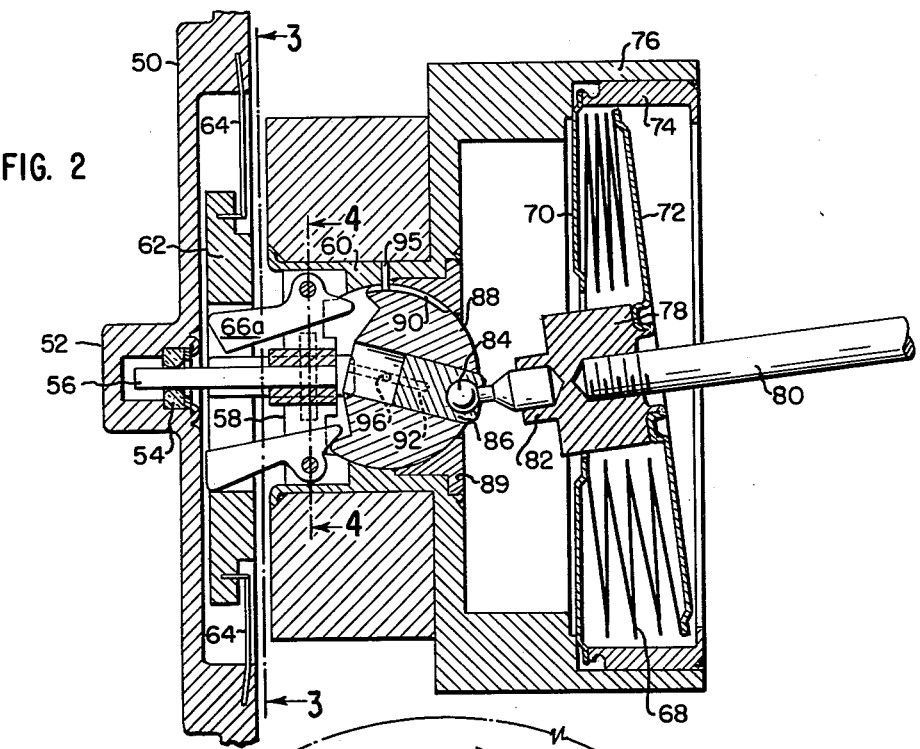
Figure 3:
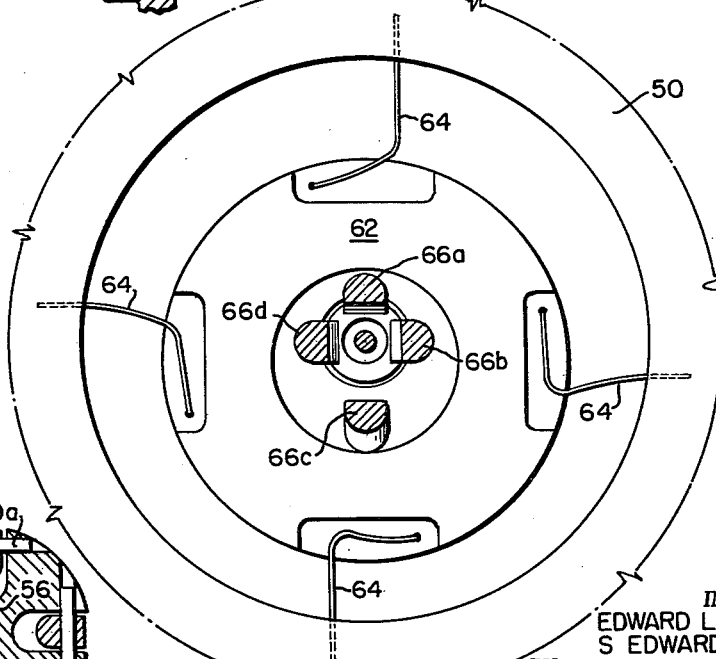
Figure 4:
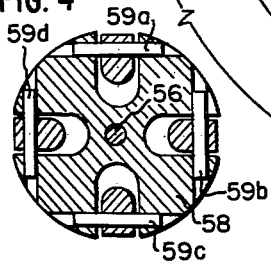

In this particular device, a mechanical link is provided from the inner surface of the bellows or diaphragm and the weight which is supported by the deformable member or members. A tool removably attached to the outer bellows surface is utilized to manipulate the bellows from outside the housing and thus to vary the position of the gimbal balancing weight. Proper balance in rotary devices is always desirable and hence the present invention is applicable to apparatus other than floated gyroscopes. However, the embodiment of the invention here described and illustrated is such a gyroscope which has been selected as a typical device in which the invention finds advantageous application. For a better understanding of the present invention together with other and further features, objects and advantages, reference should be made to the following description which is to be read in connection with the attached drawings in which:

FIG. 1 is a front sectional elevation of a relatively simple form of the present invention, FIG. 2 is a sectional side elevation of a more sophisticated form of a gyroscope gimbal balancing mechanism embodying the present invention, FIG. 3 is a sectional end view taken along the line 3—3 of FIG. 2 indicating the disposition and supporting members for the gimbal balancing weight of the present invention, and FIG. 4 is a sectional, detailed view taken along the line 4—4 of FIG. 2 of the levers utilized to manipulate the weight of the present invention.

There is illustrated in FIG. 1 a gyroscope having a cylindrical housing or case 10 in which an internal annular shoulder 11 is formed. Abutting the shoulder is a disc or plate 12 in which there are two openings. In the central opening a bearing housing 14 is pressed. The gimbal 15 of the gyroscope has a pin 16 firmly attached to its upper end and extending axially outward. The pin 16 is held in an annular jeweled bearing 18. The end of the pin 16 is in contact with a ball 20 which is spring-loaded against the housing 14 by means of a spring 22 which is compressed between the ball and the housing.

The other or off-center opening 26 in the wall 12 lies adjacent the housing but removed from the axis of the device. Through the opening 26 there passes a deformable rod 28 which is terminated in a flange 30 which is brazed, welded, or similarly attached to both the deformable support rod 28 and to the gimbal 15. At the opposite end of the deformable rod 28, is a weight 32. The weight 32 is disposed more or less on the axis of the gimbal 15 and is firmly attached to the rod. An inverted cup or roughly circular set of fingers 34 is attached to the inner surface of a plate 38 which forms the closed inner end of a bellows 40. The cup 34 has an internal diameter of sufficient breadth to clear the weight 32.

The bellows 40 is sealed to an annular ring 42 brazed into the end of the cylindrical housing 10. The manner of attachment of the cup 34 to the bellows plate 38 is of relative unimportance. It may, however, be accomplished by means of a threaded stud 36 having a flange 46 which is welded or brazed in air-tight relationship to the bellows plate. A tapped central opening extends axially through the cup and is engaged by the threaded lower end of the stud 36.

A detachable handle 48 is provided with a tapped opening at its lower end as shown. The threads tapped in the opening engage those on the upper end 44 of the stud 36 permitting easy attachment and removal of the handle.

As is indicated by the showing of the weight 32 in dotted lines in an alternative position, it is possible by manipulating the handle 48 to move the cup 34 and thereby to adjust the position of the weight 32. Adjustment of the weight in this fashion is possible only by slightly distorting the bellows, but the distortion is insufficient to cause damage despite movements over an appreciable distance. In any event, it is possible to provide a balance of the gimbal 15 without such damage.

A more sophisticated version of the basic gimbal balancing apparatus is shown in FIGS. 2, 3, and 4. A portion of a gimbal plate 50 is illustrated as having a central hub and a relatively wide shallow depression formed in its end. The hub 52 serves as a jewel holder retaining a jeweled bearing 54. The jeweled bearing may be permanently retained in place by peening or other suitable attachments. A pivot pin 56 on which the gimbal plate turns is journaled in the jeweled bearing 54. The pivot pin is held in fixed relationship to the case or housing by means of an annular spider 58. The annular spider 58 is best shown in FIG. 4. It includes a central opening in which the pivot pin 56 is fixed by means of a bushing and four radial slots across which pivot pins 59a, 59b, 59c, and 59d respectively are positioned for purposes explained below.

A gimbal weight 62 is supported in the shallow depression in the gimbal plate by means of deformable wires or rods 64. The gimbal weight 62 has a central opening of substantial diameter. The spider 58 provides support for four lever arms 66a, 66b, 66c, and 66d which pivot on the pins 59a, 59b, 59c, and 59d respectively. The lever arms are equally spaced about the periphery of the spider 58. One end of each lever arm is provided with a surface for engaging the wall of the gimbal weight 62. Pointed extensions are formed on the ends of the lever arms at the opposite sides of the pivot points. Manipulation of the lever arms permits movement of the gimbal weight 62 in any desired direction depending upon the particular arm or arms which are moved.

In this embodiment of the invention a bellows 68 forms a portion of the housing and is functionally the same as the bellows in the device illustrated in FIG. 1. However, in this instance the bellows 68 is formed with an inner plate 70 and an outer plate 72. The inner plate 70 is sealed to a ring 74 which in turn is welded or brazed to the inner wall of the end of the housing at 76. The outer plate 72 of the bellows is sealed to a central block 78 in which a tapped opening is provided to receive a detachable handle 80.

Within the housing the central block has an extension of reduced diameter 82 in which a ball 84 is firmly held. Cooperating with the ball 84 to form a ball-and-socket universal joint is a socket sleeve 86. The socket sleeve 86 is fixed centrally in a guide member 88 having the shape of a truncated sphere. A plug 89 having a generally hemispherical internal surface retains the guide member 88 in position within the necked-down portion of the housing. The plug itself is retained in the housing by any suitable means, for example, by peening as shown. The guide member 88 is provided with four slots about its periphery of which the slots 90 and 92 are typical. Pins, of which those shown at 95 and 96 are typical, extend inwardly from the reduced portion of the housing and are disposed in the slots in the spherical member 88. These slots and pins cooperate to determine the direction of the movement of the guide member 88. The disposition of the slots relative to the lever arms is such that movement in one of the two possible directions causes either of two opposite lever arms to be moved, and movement of the spherical member in the other of the two possible directions causes either of the other two opposite lever arms to be moved. The truncated portion of the guide member 88 is provided with a pointed extension extending about its periphery for engaging the lever arms.

Shifting of the gimbal weight 62 is obtained by the transmission of a transverse motion through the bellows 68 in the same manner as in the device shown in FIG. 1. The handle 80 is, similarly to the handle 48, detachable from the central bellows area after balance is achieved.

The device shown in FIG. 2 has certain advantages over that shown in FIG. 1. For one thing assembly of the components is simpler, and for another, less end-to-end change of weight distribution is encountered in the balancing operation.

Although what has been disclosed constitute preferred embodiments of the present invention, numerous modifications and alternative applications will suggest themselves to those skilled in the art. The invention is applicable to numerous devices other than the floated gyroscopes described in connection with a preferred embodiment of the invention. Some devices, cited not to limit the claims but as examples of alternatives, are pendulous accelerometers, velocity meters, other types of gyroscopes and various sealed mechanisms. The invention should, therefore, be limited only by the spirit and scope of the appended claims.

What is claimed is:

1. A balancing device for the gimbal of an instrument sealed in a housing comprising a weight disposed adjacent one end of said gimbal, at least a support member normally retaining said weight in a fixed position relative to said gimbal, a bellows forming an integral part of said housing adjacent said weight, a member attached to the inside of said bellows for effecting radial movements of said weight, and means detachably secured to the outside of said bellows for manipulating said bellows to move said weight relative to said gimbal in a direction perpendicular to the axis of symmetry of said bellows.

2. A device as defined in claim 1 wherein said weight is attached to said gimbal by a single support wire and said member attached to the inside of said bellows includes an end portion for contacting peripheral surfaces of said weight.

3. A device as defined in claim 1 wherein said gimbal is provided with a shallow depression in which said weight is positioned, and said support member comprises a plurality of support wires normally retaining said weight in a fixed position relative to said gimbal.

4. A balancing device for a floated gyroscope having a gimbal and a housing which includes a flexible bellows as an integral part thereof comprising a weight disposed in a shallow end depression formed in said gimbal, a plurality of lever arms pivoted from said housing to contact surfaces of said weight to effect radial movement thereof, a plurality of support wires normally retaining said weight in fixed relationship to said gimbal, a spherical guide retained in said housing and having extensions formed thereon for moving said lever arms, a ball-and-socket joint for moving said guide member and said lever arms, the ball portion of said joint being firmly fixed to the inside of said bellows, and a detachable handle secured to the outside of said bellows, manipulation of said handle effecting movement of said weight and deformation of said support wires to relocate said weight relative to said gimbal.

5. A balancing device for a floated gyroscope sealed in a housing which includes a flexible bellows as an integral part thereof, said gyroscope including a rotatable gimbal, comprising a weight, a deformable support wire connecting said weight to said gimbal and maintaining said weight within said housing adjacent said bellows, means attached to the inside of said bellows for contacting said weight and effecting movement thereof, and means attached to the outside of said bellows for flexing said bellows to move said weight in a direction perpendicular to the axis of symmetry of said bellows and deform said support wire, whereby said weight is moved substantially radially of said gimbal.

References Cited in the file of this patent
UNITED STATES PATENTS 2,707,882    Kent ------------------ May 10, 1955
2,855,782    Grohe ----------------- Oct. 14, 1958